May 13, 1969         G. L. SILVER         3,443,912
SEPARATION OF URANIUM AND THORIUM FROM PLUTONIUM
Filed April 26, 1968
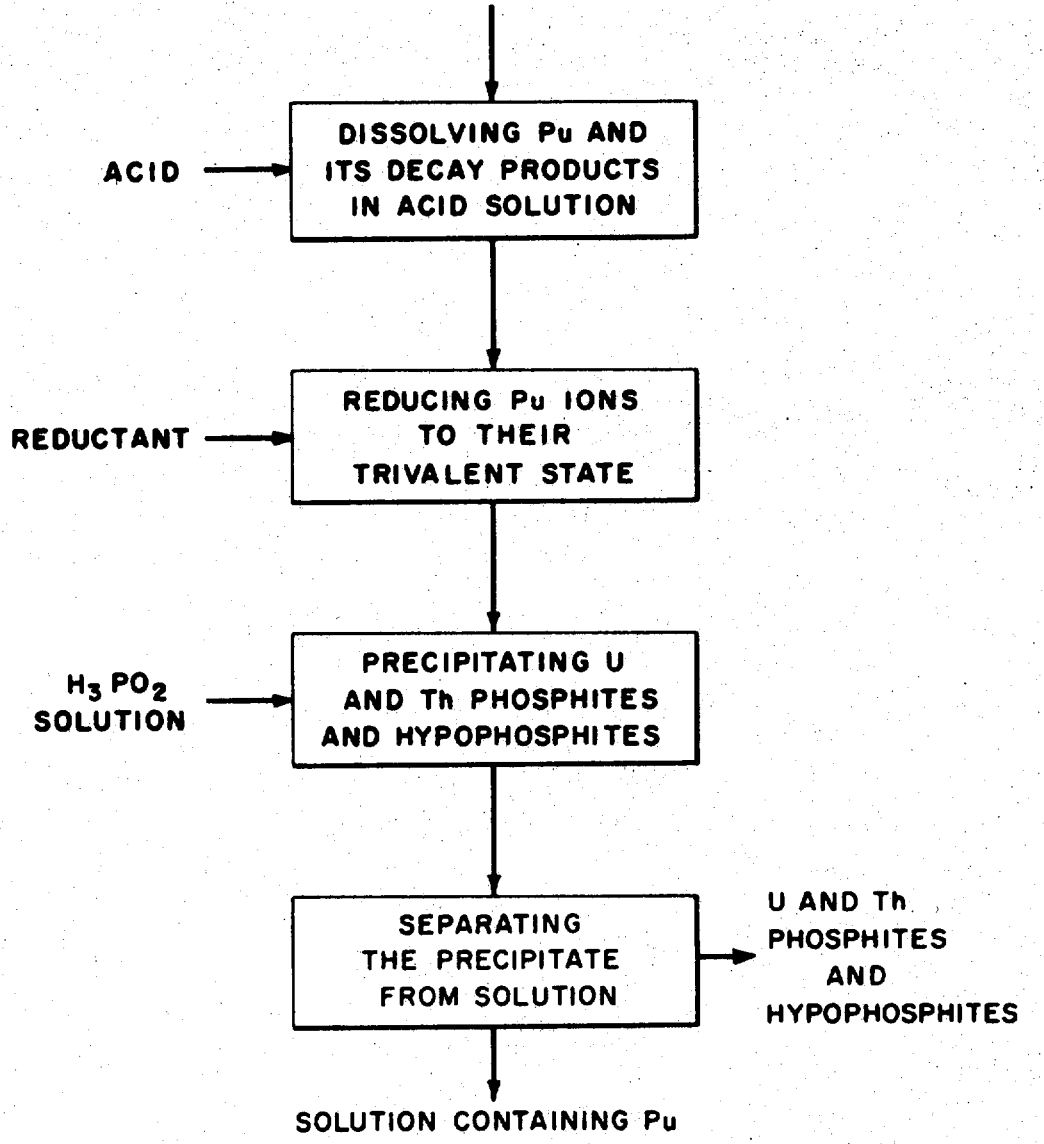
INVENTOR.
Gary L. Silver
BY

United States Patent Office 3,443,912
Patented May 13, 1969

3,443,912
SEPARATION OF URANIUM AND THORIUM FROM PLUTONIUM
Gary L. Silver, Centerville, Ohio, assignor to the United States of America as represented by the United States Atomic Energy Commission
Filed Apr. 26, 1968, Ser. No. 724,357
Int. Cl. C01g 56/00
U.S. Cl. 23—333                                6 Claims

ABSTRACT OF THE DISCLOSURE

A precipitation process for use in purification of plutonium comprising dissolving the plutonium and its decay products in an acid solution, adding a suitable reducing agent to convert and maintain the plutonium ions in the plus three ionic state, slowly evaporating the solution to gradually and progressively precipitate uranium and thorium as phosphites and hypophosphites to form a homogeneous precipitate essentially devoid of trapped plutonium, and separating the precipitate from the solution.

BACKGROUND OF INVENTION

Plutonium isotopoes such as plutonium-238 and plutonium-236 may be used for nuclear reactor fuel rods or radioactive heat source fuels. Both of these isotopes normally emit alpha radiation to decay to uranium-234 and uranium-232, which further decay to thorium-230 and thorium-228. It may be desirable to recover valuable plutonium decay products and purify the plutonium when the reactor fuel rods are reprocessed or when the heat source has been retired. The uranium and thorium recovered may have utility as a heat source fuel or for chemical and biological research as well as for further nuclear research.

Prior methods for separationg thorium and uranium from plutonium have included solvent extraction and ion exchange. Both of these prior processes are limited by the chemical similarity between uranium, plutonium, and thorium. Furthermore, intense alpha particle radiation may be detrimental to the resins required in the ion exchange separation.

Generally separations performed by precipitating one or more select components from a solution including a plurality of components have produced a heterogeneous precipitate including trapped particles of the components which were desired and intended to remain in solution. Such heterogeneous precipitates are in many cases the result of rapid and sudden precipitate formation after contact between the solution and the precipitant.

SUMMARY OF INVENTION

Therefore it is an object of this invention to provide a new and improved method for separation and at least partial purification of plutonium from uranium and thorium.

It is a further object to provide a method of precipitating uranium and thorium from a plutonium solution without trapping particles of plutonium in the precipitate.

Various other objects and advantages will become apparent from the following description and embodiment of the invention.

The invention, as shown, is a method of separating uranium and thorium from plutonium comprising dissolving plutonium and its decay products in an acid solution, reducing plutonium ions in the solution to a plus three state for subsequent formation of soluble plutonium phosphites, adding hypophosphorous acid to the acid solution to form insoluble phosphites and hypophosphites of uranium and thorium, precipitating the uranium and thorium phosphites and hypophosphites, and separating the precipitate from the acid solution.

DESCRIPTION OF DRAWINGS

The drawing is a flow diagram illustrating the method of the present invention.

DETAILED DESCRIPTION

The method of the invention may be initiated by dissolving plutonium and its decay products, including uranium and thorium in a suitable acid solution. A solution of one to two molar hydrochloric or nitric acid may be used but some plutonium compounds such as plutonium dioxide may be more readily dissolved in hot concentrated or saturated aqueous solutions of nitric acid. If nitric acid is left in solution, it may interfere with the subsequent chemical reduction of plutonium described below. Nitric acid may be removed by evaporating the dissolved plutonium solution until denitration commences followed by fuming with concentrated hydrochloric acid or hydrogen chloride vapors until all the nitrate ions have been removed or scrubbed from the solution. Then, the solution may be diluted with a one to two molar hydrochloric acid solution in preparation for the plutonium reduction. Hydrochloric acid is a weaker oxidizing agent than nitric acid and accordingly will not react to any substantial degree with the reducing agent added in the following step.

Plutonium may in many cases assume the plus three, four, and six ionic states in acid solution. All or substantially all of these plutonium ions may be chemically or electrochemically reduced to the plus three state to prevent precipitation of plutonium phosphites along with the subsequent precipitation of uranium and thorium phosphites and hypophosphites. Plutonium plus three phosphites are generally more soluble in acid solutions than other plutonium phosphites. The ionic reduction may be accomplished by adding a suitable reductant such as hydrazine or hydroxylamine to the plutonium solution maintained at an elevated temperature somewhat below the boiling point of the plutonium solution to increase the rate of the reduction reaction.

After all of the plutonium has been reduced to the plus three ionic state, uranium and thorium may be precipitated from the solution as insoluble phosphites and hypophosphites such as the tetravalent uranium and thorium hypophosphites ($U(H_2PO_2)_4$, $Th(H_2PO_2)_4$) or phosphites ($U(HPO_3)_2$, $Th(HPO_3)_2$). A precipitant such as a solution of hydrogen iodide and hypophosphorus acid may be added to the plutonium solution to effect this separation. The hydrogen iodide enhances the solubility of the trivalent plutonium phosphites without appreciably affecting the insoluble phosphites and hypophosphites of tetravalent cations such as thorium and uranium. Hydrogen iodide is normally unstable in aqueous solution and oxidizes to free iodine and water, but hypophosphous acid tends to stabilize hydrogen iodide in solution. Precipitant solutions having in excess of 5 percent by weight hydrogen iodide may be satisfactory, but it has been found that an especially effective solution may be provided with about 50% by weight hydrogen iodide and about 1½% by weight hypophosphorous acid in aqueous solution.

Hypophosphorous acid directly reacts with uranium and thorium to produce the insoluble hypophosphites to these two elements. In addition, this acid may disproportionate on heating into phosphine gas and phosphorous acid;

$$3H_3PO_2 = PH_3 + 2H_3PO_3 \qquad (1)$$

Subsequent reaction of uranium and thorium with phosphorous acid produced by the above reaction may result in insoluble phosphites which precipitate along with the insoluble hypophosphites.

Tetravalent uranium and thorium phosphites or hypophosphites form sufficiently insoluble precipitates in most acid solutions to perform the separation of the present invention. Phosphites or hypophosphites including these elements in other ionic states may not be as insoluble. The uranium and thorium which result from the dissolution of the plutonium will normally be present as hexavalent uranium in the form of the uranyl ion ($UO_2^{++}$) and tetravalent thorium.

Due to the sparsity of both uranium and thorium in solutions prepared with radioactively decayed plutonium, it may be desirable to add more uranium in such forms as uranyl chloride ($UO_2Cl_2$) to act as a precipitation carrier. The uranyl ions, either original or those later introduced as a carrier, may be reduced to tetravalent uranium by hypophosphorous acid as follows:

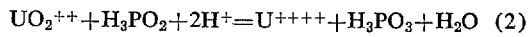

The reaction provides both tetravalent uranium and phosphorous acid which may react to provide an insoluble phosphite. If desired, the uranyl ions added as a precipitation carrier may include a more abundant and less costly isotope of uranium such as uranium-238. However, any subsequent isolation of the uranium-232 and 234 combination would be rendered more difficult.

It has been found that the precipitation of the insoluble uranium and thorium phosphites and hypophosphites may be made to proceed at a gradual and progressive rate to form a homogeneous precipitate of these two metals having essentially no plutonium trapped or carried down from the solution with the precipitate. The solution including the precipitant may be prepared sufficiently dilute to prevent immediate precipitation. An illustration of the relative volumes that may be used is set forth in the example below. Then the solution may be gently evaporated to reduce its volume to initiate and gradually form the homogeneous precipitate.

The precipitate may be separated from the plutonium solution by a suitable process such as vacuum or centrifugal filtration. Plutonium solution adhering to the separated precipitate may be washed away with such as ferric chloride and dilute hydrochloric acid solutions. Should any plutonium be unexpectedly coprecipitated with uranium and thorium, it may be removed by dissolving the precipitate in hot concentrated nitric acid and extracting the uranium and thorium into an organic solvent such as trioctylphosphine oxide in cyclohexane followed by scrubbing the solvent free of plutonium with such as a nitric acid solution containing sodium fluoride, ferrous sulfate, and sulfamic acid.

EXAMPLE

About 0.5 gram of plutonium-238, plutonium-236 and their decay products are dissolved in about 100 milliliters of aqueous nitric acid. The solution is evaporated until denitration commences and then is fumed with concentrated hydrochloric acid until all nitrate ions have been replaced by chloride ions. Next the solution is diluted to about 50 milliliters with aqueous one to two molar hydrochloric acid followed by addition of about 0.5 to 1.5 grams of hydroxylamine hydrochloride to reduce the plutonium ions to the plus three ionic state while maintaining the solution near or below its boiling temperature. The solution is then cooled and about 50 milliliters of about 47% by weight hydrogen iodide containing about 1.5% by weight hypophosphorous acid in aqueous solution is added. Subsequently, the solution is gently evaporated until a crystalline precipitate appears. Continued boiling may increase the quantity of uranium and thorium separated from the plutonium. The precipitate is suction washed with an excess of about two molar aqueous hydrochloric acid, followed by a thorough suction wash with one molar ferric chloride in one molar aqueous hydrochloric acid, and finally washed free of the ferric chloride with an excess of about two molar hydrochloric acid.

The method of the invention may also be used to quantitatively analyze the ratio of plutonium-238 to plutonium-236 in an original sample by isolating the uranium from the uranium-thorium precipitate by conventional methods and determining the amount of uranium-232 and uranium-234 by alpha pulse height analysis. From the known rates of decay of the plutonium isotopes and the amounts of uranium isotopes produced, the original proportion of plutonium-238 to plutonium-236 may be found.

The invention provides a method for separating and at least partially purifying plutonium from its decay products uranium and thorium. Further the method produces a homogeneous precipitate of uranium and thorium which contains none of negligible quantities of plutonium.

It will be understood that various changes in the details, materials and arrangement of the process steps, which have been described and illustrated in order to explain the invention, may be made by those skilled in the art within the scope of the invention expressed in the claims.

What is claimed is:
1. The method of separating plutonium from its uranium and thorium decay products comprising, dissolving in an acid solution selected from the group consisting of nitric and hydrochloric acid plutonium and its decay products for providing plutonium ions, uranium ions, and thorium ions in said acid solution, reducing said plutonium ions in solution to their trivalent state, reacting said plutonium ions, thorium ions and uranium ions in solution with hypophosphorus acid to form insoluble phosphites and hypophosphites of uranium and thorium, precipitating said insoluble uranium and thorium phosphites and hypophosphites, and separating said precipitated uranium and thorium phosphites and hypophosphites from said solution containing plutonium.

2. The method of claim 1 wherein said dissolving in an acid solution comprises dissolving in nitric acid, heating said solution until denitration commences, fuming said solution with hydrogen chloride vapors until substantially all nitrate ions are removed, and diluting said solution with one to two molar hydrochloric acid.

3. The method of claim 1 wherein said reducing of plutonium ions comprises adding a reducing agent selected from the group consisting of hydroxylamine and hydrazine.

4. The method of claim 1 wherein said hypophosphorous acid is carried in an about 50% by weight hydrogen iodide solution at a concentration of about 1.5% by weight.

5. The method of claim 1 wherein said precipitating uranium and thorium phosphites and hypophosphites comprises gently evaporating a portion of said solution to initiate precipitation of a homogeneous uranium and thorium phosphite and hyphosphite crystalline solid.

6. The method of claim 1 wherein said separating the precipitate from the solution comprises vacuum filtering and washing said precipitate with one to two molar hydrochloric acid and one molar ferric chloride.

References Cited

UNITED STATES PATENTS

| | | | |
|---|---|---|---|
| 2,882,123 | 4/1959 | Long | 23—333 |
| 2,869,980 | 1/1959 | Grinstead | 23—333 |
| 1,351,489 | 8/1920 | Ryan | 23—328 |

CARL D. QUARFORTH, *Primary Examiner.*

M. J. McGREAL, *Assistant Examiner.*

U.S. Cl. X.R.

23—328, 345, 346